(12) United States Patent
Barillot

(10) Patent No.: US 12,030,377 B2
(45) Date of Patent: Jul. 9, 2024

(54) ELECTRIC POWERTRAIN FOR A VEHICLE

(71) Applicant: VOLVO TRUCK CORPORATION, Gothenburg (SE)

(72) Inventor: Thomas Barillot, Mornant (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/053,862

(22) Filed: Nov. 9, 2022

(65) Prior Publication Data

US 2023/0150356 A1    May 18, 2023

(30) Foreign Application Priority Data

Nov. 16, 2021    (EP) ..................................... 21208596

(51) Int. Cl.
| | | |
|---|---|---|
| *B60K 17/08* | (2006.01) | |
| *B60K 1/02* | (2006.01) | |
| *F16H 3/00* | (2006.01) | |
| *F16H 3/091* | (2006.01) | |
| *F16H 3/093* | (2006.01) | |
| *B60K 6/40* | (2007.10) | |

(52) U.S. Cl.
CPC ................ *B60K 17/08* (2013.01); *B60K 1/02* (2013.01); *F16H 3/006* (2013.01); *F16H 3/091* (2013.01); *F16H 3/093* (2013.01); *B60K 6/40* (2013.01); *B60Y 2200/92* (2013.01); *F16H 2200/0021* (2013.01); *F16H 2200/0034* (2013.01); *F16H 2200/0043* (2013.01)

(58) Field of Classification Search
CPC .......... F16H 3/006; F16H 3/091; F16H 3/093; F16H 2200/0021; F16H 2200/0034; F16H 2200/0043; B60K 1/02; B60K 6/40; B60K 17/08
See application file for complete search history.

(56) References Cited

FOREIGN PATENT DOCUMENTS

| CN | 104015600 A | | 9/2014 |
|---|---|---|---|
| CN | 106337905 | * | 1/2017 |
| DE | 102020202788 B3 | | 4/2021 |
| EP | 3854616 A1 | | 7/2021 |
| JP | 58-77954 | * | 5/1983 |
| WO | 2020025775 A1 | | 2/2020 |
| WO | 21073748 A1 | | 4/2021 |
| WO | 2021078388 A1 | | 4/2021 |

OTHER PUBLICATIONS

Extended European Search Report in corresponding European Application No. 21208596.3 dated Apr. 26, 2022 (5 pages).

* cited by examiner

*Primary Examiner* — William C Joyce
(74) *Attorney, Agent, or Firm* — Venable LLP; Jeffri A. Kaminski

(57) ABSTRACT

An electric powertrain for a vehicle provides electric propulsion to the vehicle. The electric powertrain includes a first electric motor linked to a first gear module through a motor shaft, said first gear module including a primary shaft on which are arranged a first primary gear and a second primary gear, a second gear module including a secondary shaft on which are arranged a first secondary gear that is meshing with the second primary gear, at least one countershaft on which are arranged a first quaternary gear and a second quaternary gear, a coupling member arranged at the first extremity of the primary shaft.

8 Claims, 3 Drawing Sheets

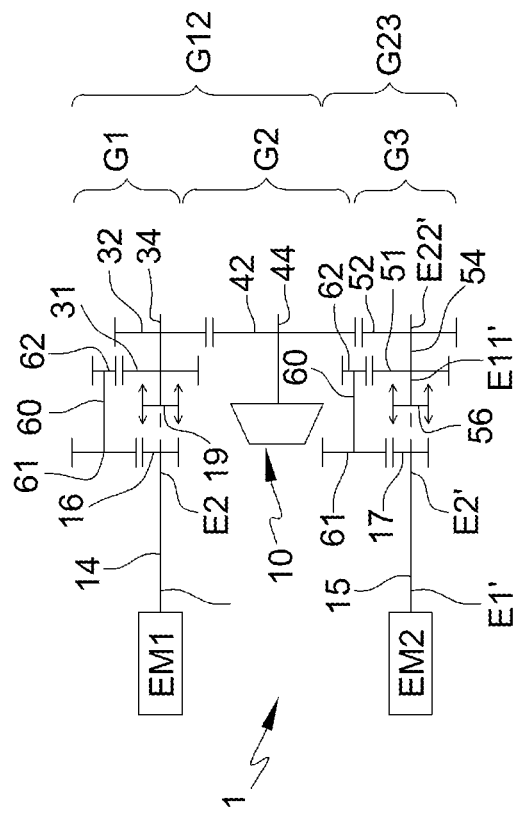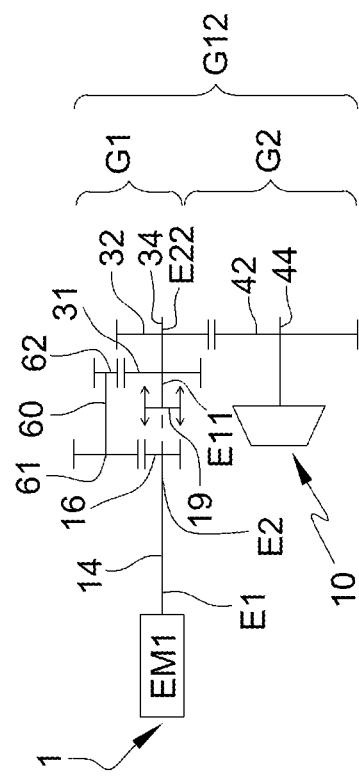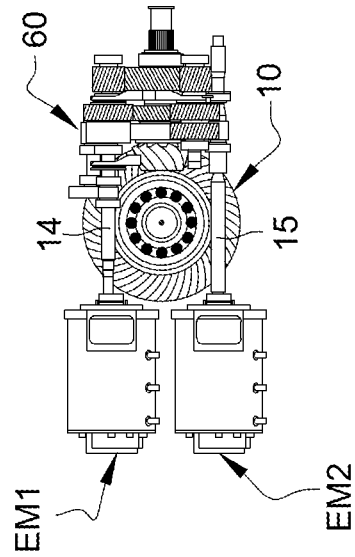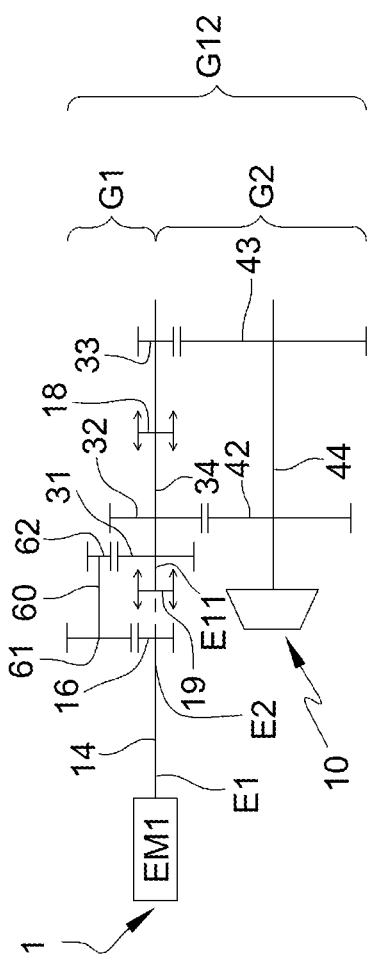

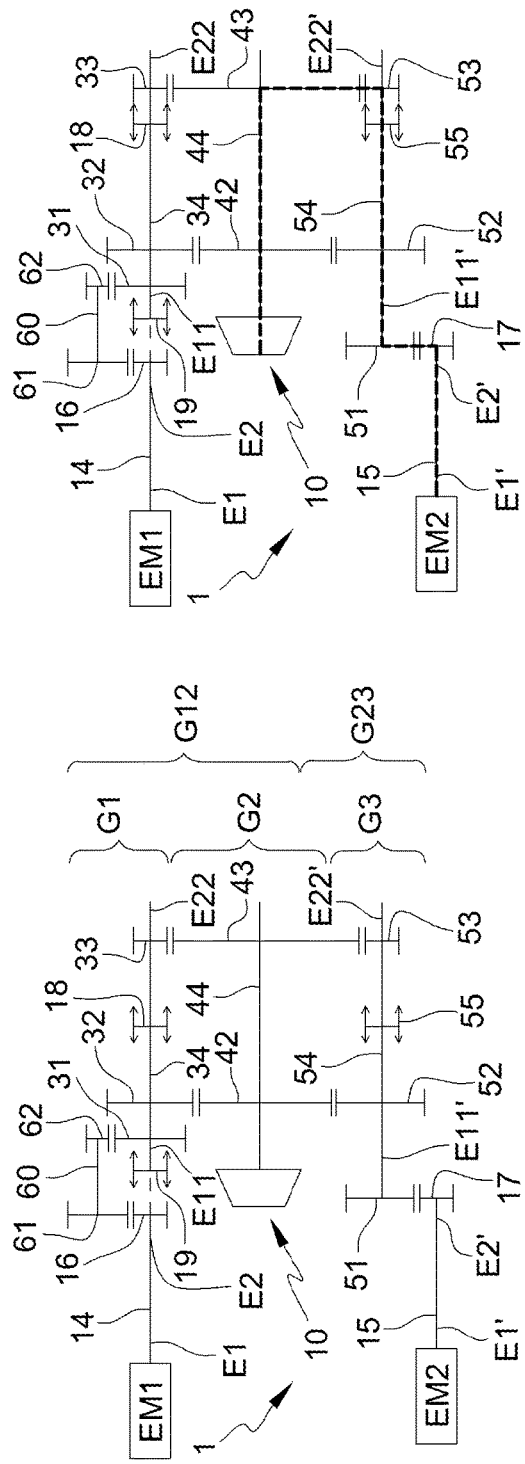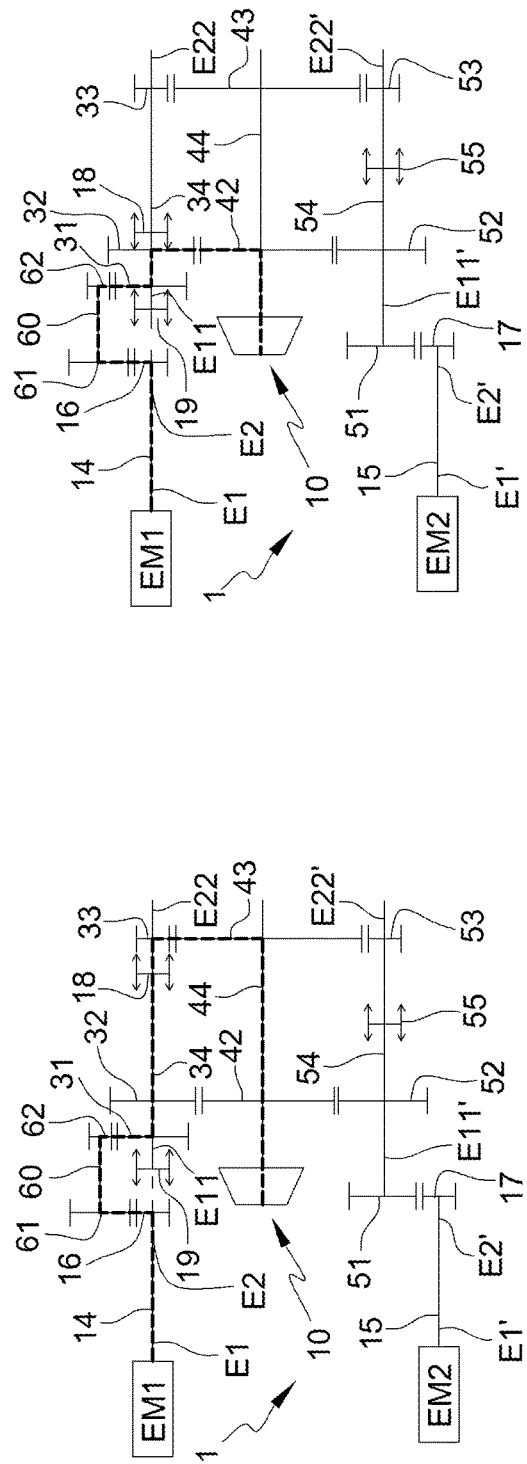

ELECTRIC POWERTRAIN FOR A VEHICLE

TECHNICAL FIELD

The invention relates to an electric powertrain for a vehicle.

Typically, the invention applies to an electric powertrain integrated into a vehicle axle. As an example, an electric axle (or "E-axle") is a front or rear axle that includes an axle body (or "housing") adapted to receive a powertrain, which is arranged to provide torque to the wheels of the axle. The "E-Axle" is a compact and economical electric drive solution for battery electric vehicles, fuel cells and hybrid applications. The electric motor(s), electronics and transmission are combined in a compact unit that directly drives the wheels.

The invention can be applied in low-duty, medium-duty and heavy-duty vehicles, such as trucks, buses and construction equipment, as well as in passenger cars. Although the invention will be described with respect to a truck, the invention is not restricted to this particular vehicle type. Indeed, the electric powertrain of the invention could also be used in watercrafts such as ships or boats.

BACKGROUND

The transport industry is currently in the process of transition to electro-mobility, which implies the use of electric power to drive vehicles. Electro-mobility is mainly developed to meet increasingly stringent emission regulation requirements and the banning of internal combustion engine vehicles by some cities.

In order to free as much space as possible for batteries, chassis and other large parts, such as aerodynamic profiles, the powertrain must be as compact as possible.

Most electric motors have an ideal operating range that is achieved at high speed and low torque, while internal combustion engines have an ideal operating range that is achieved at low speed and high torque. In order to meet the torque demand at the wheels, typically for hill starts or high load starts, a relatively high reduction ratio (usually between 20 and 50) between the electric motor and the wheels is required. This reduction ratio can only be achieved with several reduction stages, which requires space.

A problem with using a gearbox having a fixed speed gearbox is that the electric motor would run at high speed and low torque in cruise mode conditions and that in such conditions, the efficiency of the motor is not optimal. In addition, high-speed conditions also increase stresses on the gears, bearings and sealing rings of the transmission, which reduces the durability of the transmission.

In addition, a gearbox with gears rotating at high speed also creates lubrication problems. Indeed, a gear rotating too fast may not be lubricated properly since the oil between two successive teeth is ejected by centrifugal force and metal-to-metal contact may occur between the teeth of the two gears in mesh, which generates heat and, consequently, potentially irreversible mechanical damage.

High rotation speed is also generally creating more noise and vibrations. This can be problematic from regulation perspectives and for customers (both drivers and persons outside the vehicle).

Additionally, the conventional electric powertrain cannot be adapted to a wide range of vehicle including low-duty vehicles, medium-duty vehicles and heavy-duty vehicles. Thus, vehicles manufacturers have to develop and/or supply themselves with a wide range of electric powertrains, each powertrain corresponding to one kind of vehicle. The production cost is therefore significantly high and the manufacturing method is not optimized.

Patent application WO2021078388 relates to a vehicle axle, comprising:
 a differential;
 a powertrain, comprising a first electric motor (EM1) and a second electric motor (EM2);
 a first transmission element between the first electric motor and said differential, this first transmission element comprising a variable transmission ratio;
 a second transmission element between the second electric motor and said differential.

There is a need to ensure the efficiency of the electric powertrain in many conditions, such as at high speed and low torque, as well as the durability of the gearbox.

The invention aims more particularly to remedy to the above disadvantages, by providing a more compact and robust electric powertrain providing an increased number of speeds, and ensuring a better efficiency of the electric motor in many conditions by offering several gear ratios. Additionally, the invention aims to provide an electric powertrain that can be easily adapt on a wide range of vehicles.

SUMMARY

The object is achieved by providing an electric powertrain configured to provide electric propulsion to the vehicle characterized in that said electric powertrain comprises:
 a first electric motor linked to a first gear module through a motor shaft having a first extremity and a second extremity, said first gear module including a primary shaft, having a first extremity and a second extremity, on which are arranged a first primary gear and a second primary gear,
 a second gear module including a secondary shaft on which are arranged a first secondary gear that is meshing with the second primary gear,
 at least one countershaft on which are arranged a first quaternary gear and a second quaternary gear, the first quaternary gear meshing with a pinion fixedly secured the second extremity of the motor shaft, and the second quaternary gear meshing with the first primary gear such that the countershaft and the motor shaft are disposed in parallel
 a coupling member arranged at the first extremity of the primary shaft configured to reach a first position wherein the coupling member meshes with the pinion so that the motor shaft is drivingly engaged with the primary shaft, a second position wherein the coupling member meshes with the first primary gear so that the first primary gear drivingly engages the primary shaft or a neutral position in which it allows the first primary gear to rotate freely around the primary shaft.

By the provision of the electric powertrain comprises the above specific architecture, the electric powertrain is adapted to one kind of vehicle, in particular to the vehicle load, the vehicle architecture, the vehicle topography, the customers' expectations and the vehicle application. Furthermore, the architecture of the electric powertrain according to the present invention is optimized to include a countershaft offering a better efficiency and a higher number of speeds. The electric powertrain may provide from two to eight speeds ratio. Additionally, the electric powertrain is more compact and robust. Thus, the electric powertrains according to the present invention allow for a reduction of the production costs, an increased productivity and a better efficiency.

According to one embodiment, a third primary gear is arranged on the second extremity of the primary shaft.

According to one embodiment, a coupling member is arranged along the primary shaft between the second primary gear and the third primary gear.

According to one embodiment, the electric powertrain further comprises:
- a second electric motor linked to a third gear module through a motor shaft having a first extremity and a second extremity, said third gear module including a tertiary shaft, having a first extremity and a second extremity, on which are arranged a first tertiary gear and a second tertiary gear,
- the first secondary gear meshing with the second tertiary gear.

According to one embodiment, the electric powertrain further comprises:
- a second countershaft wherein the first quaternary gear is meshing a pinion fixedly secured the second extremity of the motor shaft and the second quaternary gear is meshing with the first tertiary gear such that the countershaft and the motor shaft are disposed in parallel and
- A coupling member arranged at the first extremity of the tertiary shaft configured to reach a first position wherein the coupling member meshes with the pinion so that the motor shaft is drivingly engaged with the tertiary shaft, a second position wherein the coupling member meshes with the first tertiary gear so that the first gear drivingly engages the tertiary shaft or a neutral position in which it allows the first tertiary gear to rotate freely around the tertiary shaft.

According to one embodiment, a third tertiary gear is arranged on the second extremity of the tertiary shaft.

According to one embodiment, a coupling member is arranged along the tertiary shaft between the second tertiary gear and the third tertiary gear.

According to one embodiment, a third secondary gear is arranged on the secondary shaft.

The object is achieved by providing a vehicle, electric or hybrid, comprising an electric powertrain according any of the preceding claims.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 is a schematic representation of an electric powertrain according to one embodiment, FIG. 2 is a schematic representation of an electric powertrain according to one embodiment, FIG. 3 is a schematic representation of an electric powertrain according to one embodiment, FIG. 4 is a perspective view of an electric powertrain according to one embodiment, FIG. 5 is a schematic representation of an electric powertrain according to one embodiment, FIG. 6 is a schematic representation of an electric powertrain according to one embodiment, FIG. 7 is a schematic representation of an electric powertrain according to one embodiment, FIG. 8 is a schematic representation of an electric powertrain according to one embodiment.

DETAILED DESCRIPTION OF EXAMPLE EMBODIMENTS OF THE INVENTION

Figure 9:
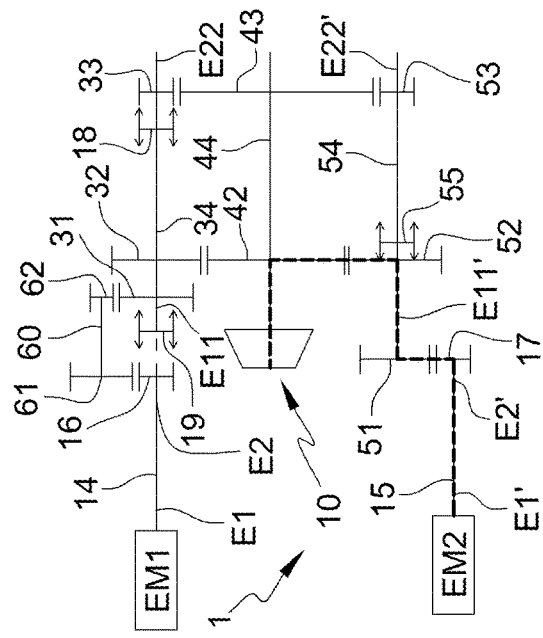
FIG. 9 is a schematic representation of an electric powertrain according to one embodiment.

The electric powertrain according to the present invention is configured to provide electric propulsion to a vehicle (not shown), which is an electric, a fuel cell or a hybrid vehicle, i.e. a vehicle using electric energy as a source of power. In the example, the vehicle may be a truck, comprising at least a front axle and a rear axle.

In an alternative embodiment, the vehicle may include one or more front and/or rear axle(s). Each axle can alternatively be none driven or driven axle(s).

At least one of the two axles is motorized, i.e. includes at least one electric motor. In the example, we consider that only the vehicle rear axle is motorized. However, the invention also applies to all wheel drive vehicles and to front wheel drive vehicles.

The rear axle includes a powertrain 1, comprising a first electric motor (or "E-motor") EM1, a first and a second electric motor EM1, EM2 or a second electric motor EM2. In the illustrated example, the two motors EM1 and EM2 are identical in that they have the same characteristics (supply voltage, operating current, torque-speed characteristic, mechanical power, etc.). For example, the mechanical power of EM1 and EM2 are between 50 kW to 500 kw. Alternatively, the two motors EM1 and EM2 can be different.

Advantageously, the electric motors EM1 and EM2 are AC type motors (synchronous or asynchronous). Alternatively, the electric motors EM1 and EM2 could be DC type motors as well (brushed or brushless). More generally, any electric motor is suitable.

Turning now to FIG. 1, one embodiment relates to an electric powertrain 1 for a vehicle having one electric motor EM1 connected to a differential (not shown) via a gearbox G12 which provides a gear reduction mechanism between the electric motor EM1 and ultimately with a vehicle driving wheel (not shown).

The gearbox G12 comprises a first primary gear 31, a second primary gear 32 arranged on a primary shaft 34 forming a first gear module G1. The electric motor EM1 comprises a motor shaft (or "rotor shaft") 14 on which may be arranged a pinion 16.

Pinion 16 is fitted on the motor shaft 14. For example, pinion 16 can be integral with shaft 14 or can be suitably assembled onto the shaft 14 with any other attachment device such as a key (not shown). The motor shaft 14 comprises a first extremity E1 connected to the first electric motor EM1 and a second extremity E2 fitted with the pinion 16. The primary shaft 34 has a first extremity E11 and a second extremity E22, said first primary gear 31 being located at the first extremity E11 of the primary shaft 34.

The electric powertrain 1 further comprises a second secondary gear 42 meshing with the second primary gear 32. The second secondary gear 42 is arranged on a secondary shaft 44, also called "output shaft", forming a second gear module G2.

The first gear module G1 can be arranged in a first gear casing (not shown) and the second gear module G2 can be arranged in a second gear casing (not shown), said first gear casing and the second gear casing being adjacent. The first gear module G1 and the second gear module G2 are arranged to form the gearbox G12. In an alternative embodiment, the first gear module G1 and the second gear module G2 can be arranged in a common gear casing (not shown).

In the electric powertrain 1 of FIG. 1, the primary first primary gear 31 freely rotates around the primary 34 and the second primary gear 32 is secured on the primary shaft 34. The primary first primary gear 31 and the second primary gear 32 have each a different outer diameter and/or a different number of teeth. Typically, the primary first primary gear 31 has a diameter which is greater than that of the second primary gear 32.

The differential (not shown) may be located between the wheels of the vehicle and is connected to electric motor EM1. The differential may comprise a crown wheel (not shown) and the gear 10 that is conical or cylindrical. When configuring the electric powertrain 1, for example, the axle has an elongated transmission housing (not shown). This transmission housing includes a central part receiving the differential and two lateral parts extending on either side of the central part. The two lateral parts receive the two drive shafts and respectively connected to the wheels. The electric motor EM1 is arranged so as to transmit a driving torque (or motor torque) to the drive shafts via the differential.

The electric powertrain 1 comprises one countershaft 60 on which are arranged a first quaternary gear 61 and a second quaternary gear 62. The pinion 16 is meshing with the first quaternary gear 61 which is secured at the second extremity E2 of the motor shaft 14. The second quaternary gear 62 is meshing with the first primary gear 31 located at the first extremity E11 of the primary shaft 34. Thus, the countershaft 60 and the motor shaft 14 are disposed in parallel.

The electric powertrain 1 comprises a coupling member 19 such as a dog clutch arranged at the extremity E11 of the primary shaft 34. The coupling member 19 is movable between a first position wherein it meshes with the pinion 16 so that the motor shaft 14 is drivingly engaged with the primary shaft 34, a second position wherein it meshing with the first primary gear 31 so that the first primary gear 31 drivingly engages the primary shaft 34 and a neutral position in which it allows the first primary gear 31 to rotate freely around the primary shaft 34 and the pinion 16 fixedly secured on the motor shaft 14 to rotate both together.

Thus, the gear ratio is obtained by selective clutching of the first quaternary gear 61 of the countershaft 60 with the pinion 16 and the second quaternary gear 62 of the countershaft 60 with the first primary gear 31 (second position of the coupling member 19) or by selective clutching of the pinion 16 of the motor shaft 14 with the primary shaft 34 (first position of the coupling member 19).

In this embodiment, the gearbox G12 includes two speed gearbox within a compact arrangement. Indeed, the countershaft 60 being parallel to the pinion 16 allows for space saving.

Typically, the motor EM1 is attached to the transmission housing by any appropriate means and in particular by bolting. Such fastening means are known as such, that is why they are not shown on the figures. Alternatively, the housing of the electric motor EM1 is integral with the transmission housing.

Advantageously, the first electric motor EM1 is offset from a longitudinal direction of the vehicle.

Preferably, the axis of rotation of electric motor EM1 is parallel to the longitudinal direction of the vehicle. Accordingly, the powertrain 1 is said to be in a longitudinal configuration relative to the axle.

As shown in FIG. 2, the gearbox G12 of the electric powertrain 1 may further comprise a third primary gear 33 arranged on a primary shaft 34 and a third secondary gear 43 arranged on a secondary shaft 44. In this example, the third secondary gear 43 is meshing with the third primary gear 33.

In this example, the primary first primary gear 31, the second primary gear 32 and a third primary gear 33 may rotate freely around the primary shaft 34. The first primary gear 31, the second primary gear 32 and a third primary gear 33 have each a different outer diameter and/or a different number of teeth. Typically, the first primary gear 31 has a diameter which is greater than that of the second primary gear 32 and the second primary gear 32 has a diameter that is greater than that of the third primary gear 33.

A coupling member 18 may be arranged along the primary shaft 34, and which is movable between a first position in which it couples the second primary gear 32 in rotation with primary shaft 34, a second position in which it couples the third primary gear 33 in rotation with primary shaft 34 and a neutral position in which it does not prevent the second and third primary gears 32, 33 from rotating around primary shaft 34.

In this embodiment, the gearbox G12 is a four speed gearbox.

FIG. 3 illustrates an embodiment wherein the electric powertrain 1 illustrated in FIG. 1 further comprises a second electric motor EM2 linked to a gear module G3 through a motor shaft 15 having a first extremity E1' and a second extremity E2', said gear module G3 including a tertiary shaft 54, having a first extremity E11' and a second extremity E22', on which are arranged a first tertiary gear 51 and a second tertiary gear 52. In this example, both electric motors EM1, EM2 are indirectly connected to the differential via a gearbox G12, G23 which provides a gear reduction mechanism between the electric motors EM1, EM2 and vehicle driving wheels.

The gearbox G12, G23 of the electric powertrain 1 may further comprise a second countershaft 60 on which are arranged a first quaternary gear 61 and a second quaternary gear 62, the electric motor EM2 being located at the first extremity E1' of the motor shaft 15. A pinion 17 is meshing with the first quaternary gear 61 which is secured at the second extremity E2' of the motor shaft 15. The second quaternary gear 62 is meshing with the first tertiary gear 51 located at the first extremity E11' of the tertiary shaft 54. Thus, the countershaft 60 and the motor shaft 15 are disposed in parallel. The first and the second countershaft 60 may have the same ratio or different ratio.

The electric powertrain 1 comprises a coupling member 56 such as a dog clutch arranged at the extremity E11' of the shaft tertiary 54. The coupling member 56 is movable between a first position in which it couples the pinion 17 so that the motor shaft 15 is drivingly engaged with the tertiary shaft 54, a second position in which it couples the first primary gear 51 so that the first tertiary gear 51 drivingly engages the tertiary shaft 54 and a neutral position in which it allows the first tertiary gear 51 to rotate freely around the tertiary shaft 54 and the tertiary shaft 54 and the pinion 17 fixedly secured on the motor shaft 15 to rotate both together.

Thus, the gear ratio is obtained by selective clutching of the first quaternary gear 61 of the counter shaft 60 with the pinion 17 and the second quaternary gear 62 of the countershaft 60 with the first tertiary gear 51 (second position of the coupling member 56) or by selective clutching of the pinion 17 of the motor shaft 15 with the tertiary shaft 54 (first position of the coupling member 56).

In this embodiment, the gearbox G12, G23 includes a four speed gearbox within a compact arrangement.

FIGS. 4 to 10 illustrate an electric powertrain 1 comprising a first and a second electric motors EM1, EM2 indirectly connected to a differential (not shown) via a gearbox G12, G23 which provides a gear reduction mechanism between both electric motors EM1, EM2 and ultimately with a vehicle driving wheel (not shown).

The first electric motor EM1 is linked to a gear module G1 through a motor shaft 14 having a first extremity E1 and a second extremity E2, said gear module G1 including a primary shaft 34 having a first extremity E11 and a second extremity E22. A first primary gear 31 and a second primary gear 32 are arranged on said primary shaft 34.

The gearbox G12, G23 of the electric powertrain 1 further comprises a secondary shaft 44 linked to a second gear module G2 on which are arranged a first secondary gear 42 that is meshing with the second primary gear 32.

The electric powertrain 1 further comprises a second electric motor EM2 linked to a gear module G3 through a motor shaft 15 having a first extremity E1' and a second extremity E2', said gear module G3 including a tertiary shaft 54, having a first extremity E11' and a second extremity E22'. A first tertiary gear 51 and a second tertiary gear 52 are arranged on the tertiary shaft 54.

The electric powertrain 1 may further comprise a countershaft 60 on which are arranged a first quaternary gear 61 and a second quaternary gear 62. The first electric motor EM1 is located at the first extremity E1 of the motor shaft 14 and a pinion 16 is meshing with the first quaternary gear 61, said pinion 16 being secured at the second extremity E2 of the motor shaft 14. The second quaternary gear 62 is meshing with the first primary gear 31 which is located at the first extremity E11 of the primary shaft 34 such that the countershaft 60 and the motor shaft 14 are disposed in parallel.

The electric powertrain 1 comprises a coupling member 19 such as a dog clutch arranged at the extremity E11 of the primary shaft 34. The coupling member 19 is movable between a first position wherein the coupling member 19 is meshing with the pinion 16 so that the motor shaft 14 is drivingly engaged with the primary shaft 34, a second position wherein the coupling member 19 is meshing with the first primary gear 31 so that the first primary gear 31 drivingly engages the primary shaft 34 and a neutral position in which it allows the first primary gear 31 to rotate freely around the primary shaft 34 and the pinion 16 fixedly secured on the motor shaft 14 to rotate both together.

The electric powertrain 1 may further comprise a third primary gear 33 arranged on the second extremity E22 of the primary shaft 34 and a third tertiary gear 53 arranged on the second extremity E22' of the tertiary shaft 54. The electric powertrain 1 may further comprise a third secondary gear 43 arranged on the secondary shaft 44, said third secondary gear 43 meshing with the third primary gear 33 and the third tertiary gear 53.

In this embodiment, the two electric motors EM1 and EM2 are arranged transverse relative to the transversal direction of the vehicle, meaning that the axis of rotation of each motor EM1 and EM2 is located in the longitudinal direction of the vehicle. Accordingly, the powertrain 1 is said to be in a longitudinal configuration relative to the axle. The advantage of such transverse configuration is that it quite compact in the longitudinal side in comparison with a longitudinal configuration. To the contrary, a longitudinal arrangement requires less space in the transverse direction.

In this embodiment, EM1 linked to the first gear module G1, the second gear module G2 and EM2 linked to the third gear module G3 extend parallel to each other. The first gear module G1 is arranged in a first gear casing (not shown), the second gear module G2 is arranged in a second gear casing (not shown) and the third gear module G3 is arranged in a third gear casing (not shown). The first gear casing, the second gear casing and the third gear casing are adjacent. In an alternative embodiment, the first gear module G1, the second gear module G2 and the third gear module G3 are arranged in a common gear casing (not shown).

Preferably, the electric motors EM1 and EM2, the first gear module G1, the second gear module G2 and the third gear module G3 are encased inside the transmission housing. Alternatively, they could be outside of the transmission housing. In this case, the housing would include standard interfaces to assemble the electric motors EM1 and EM2.

Preferably, the electric motors EM1 and EM2 are powered by an electric power source, such as at least one battery or fuel cells, which are attached to another part of the vehicle, such as the chassis.

A coupling member 18 could be arranged along the primary shaft 34, and which is movable between a first position in which it couples the second primary gear 32 in rotation with primary shaft 34, a second position in which it couples the third primary gear 33 in rotation with primary shaft 34 and a neutral position in which it does not prevent the second and third primary gears 32, 33 from rotating around primary shaft 34.

The electric powertrain 1 may further comprise a coupling member 55 arranged along the tertiary shaft 54 between the second tertiary gear 52 and the third tertiary gear 53. The coupling member 55 is movable between a first position in which it couples the second tertiary gear 52 in rotation with tertiary shaft 54, a second position in which it couples the third tertiary gear 53 in rotation with tertiary shaft 54 and a neutral position in which it allows the second and third tertiary gears 52, 53 to rotate freely around the tertiary shaft 54.

In this embodiment, the gearbox G12, G23 includes a multiple speed gearbox, in particular a six speed gearbox.

FIG. 5 illustrates an embodiment wherein the coupling member 19, the coupling member 18 and the coupling member 55 are in a neutral position. In this example, the first primary gear 31 rotates freely around the primary shaft 34 and the pinion 16 is fixedly secured on the motor shaft 14 to rotate both together; the second and third tertiary gears 52, 53 rotate freely around the tertiary shaft 54 and the second and third primary gears 32, 33 rotate freely around primary shaft 34.

FIG. 6 illustrates an embodiment wherein the coupling member 19 is in second position, the coupling member 18 is in second position and the coupling member 55 is in neutral position. In this example, the first electric motor EM1 transfers torque to the secondary shaft 44 and therefore to the vehicle driving wheels through the countershaft 60 and the primary shaft 34. In particular, the torque is transferred through the pinion 16 meshing with the first quaternary gear 61, the first primary gear 31 meshing with the second quaternary gear 62 and the third primary gear 33 meshing with the third secondary gear 43.

FIG. 7 illustrates an embodiment wherein the coupling member 19 is in second position, the coupling member 18 is in second position and the coupling member 55 is in second position. In this example, the first electric motor EM2 transfers torque to the secondary shaft 44 and therefore to the vehicle driving wheels through the tertiary shaft 54. In particular, the torque is transferred through the pinion 17 meshing with the first tertiary gear 51 and the third tertiary gear 53 meshing with the third secondary gear 43.

FIG. 8 illustrates an embodiment wherein the coupling member 19 is in second position, the coupling member 18 is in first position and the coupling member 55 is in neutral position. In this example, the first electric motor EM1 transfers torque to the secondary shaft 44 and therefore to the vehicle driving wheels through the countershaft 60 and the primary shaft 34. In particular, the torque is transferred through the pinion 16 meshing with the first quaternary gear 61, the first primary gear 31 meshing with the second quaternary gear 62 and the second primary gear 32 meshing with the second secondary gear 42.

FIG. 9 illustrates an embodiment wherein the coupling member 19 is in the first position, the coupling member 18 is in first position and the coupling member 55 is in neutral position. In this example, the first electric motor EM1 transfers torque to the secondary shaft 44 and therefore to the vehicle driving wheels through the primary shaft 34. In particular, the torque is transferred through the pinion 16 meshing with the first primary gear 31 and the second primary gear 32 meshing with the second secondary gear 42.

Figure 10:
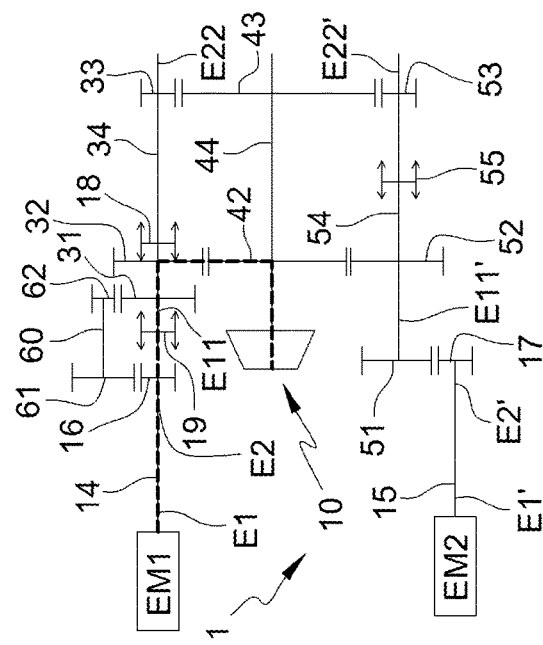
FIG. 10 is a schematic representation of an electric powertrain according to one embodiment and FIG. 11 is a schematic representation of an electric powertrain according to one embodiment.

FIG. 10 illustrates an embodiment wherein the coupling member 19 is in the second position, the coupling member 18 is in second position and the coupling member 55 is in first position. In this example, the first electric motor EM2 transfers torque to the secondary shaft 44 and therefore to the vehicle driving wheels through the tertiary shaft 54. In particular, the torque is transferred through the pinion 17 meshing with the first tertiary gear 51 and the second tertiary gear 52 meshing with the second secondary gear 42.

Figure 11:
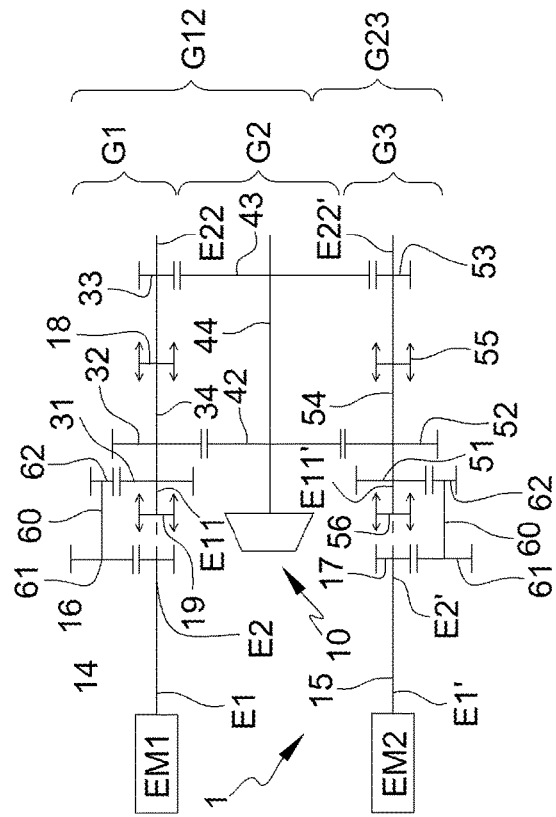

FIG. 11 illustrates the electric powertrain 1 according to FIGS. 4-10 that may further comprise a second countershaft 60 on which are arranged a first quaternary gear 61 and a second quaternary gear 62, the second electric motor EM2 being located at the first extremity E1' of the motor shaft 15. The pinion 17 is meshing with the first quaternary gear 61 which is arranged at the second extremity E2' of the motor shaft 15. The second quaternary gear 62 is meshing with the first tertiary gear 51 located at the first extremity E11' of the tertiary shaft 54 such that the countershaft 60 and the motor shaft 15 are disposed in parallel.

The electric powertrain 1 comprises a coupling member 56 such as a dog clutch arranged at the extremity E11' of the shaft tertiary 54. The coupling member 56 is movable between a first position in which it couples the pinion 17 so that the motor shaft 15 is drivingly engaged with the tertiary shaft 54, a second position in which it couples the first primary gear 51 so that the first tertiary gear 51 drivingly engages the tertiary shaft 54 and a neutral position in which it allows the first tertiary gear 51 to rotate freely around the tertiary shaft 54 and the pinion 17 fixedly secured on the motor shaft 16 to rotate both together.

In this embodiment, the gearbox G12, G23 includes a multiple speed gearbox, in particular a eight speed gearbox.

Advantageously, EM2 and/or EM1 is(are) controlled by a control device (not shown), typical an ECU (not shown). EM2 and EM1 can be controlled simultaneously or independently from each other. The ECU may control both electric motors EM2, EM1 in a way that EM1 will provide required torque to the vehicle driving wheels whereas EM2 is switching gear and EM2 will provide required torque to the wheel whereas EM1 is switching gear. This configuration corresponds to a full powershift mode meaning that there is no torque interruption at all when switching gears. This full powershift effect allows better vehicle performance and enhances driving comfort.

It is to be understood that the present invention is not limited to the embodiments described above and illustrated in the drawings; rather, the skilled person will recognize that many changes and modifications may be made within the scope of the appended claims. The electric powertrain according to the present invention may be adapted to any kind of vehicle. Furthermore, the optimized electric powertrain according to the present invention provides a higher number of speeds. The compact and robust electric powertrain provides from two to eight speeds ratio.

The invention claimed is:

1. An electric powertrain for a vehicle, the electric powertrain configured to provide electric propulsion to the vehicle characterized in that said electric powertrain comprises:
   a first electric motor linked to a first gear module through a motor shaft having a first extremity and a second extremity, said first gear module including a primary shaft, having a first extremity and a second extremity, on which are arranged a first primary gear and a second primary gear,
   a second gear module including a secondary shaft on which are arranged a first secondary gear that is meshing with the second primary gear,
   at least one countershaft on which are arranged a first quaternary gear and a second quaternary gear, the first quaternary gear meshing with a pinion fixedly secured at the second extremity of the motor shaft, and the second quaternary gear meshing with the first primary gear such that the countershaft and the motor shaft are disposed in parallel,
   a coupling member arranged at the first extremity of the primary shaft configured to reach a first position wherein the coupling member meshes with the pinion so that the motor shaft is drivingly engaged with the primary shaft, a second position wherein the coupling member meshes with the first primary gear so that the first primary gear drivingly engages the primary shaft and a neutral position in which it allows the first primary gear to rotate freely around the primary shaft,
   a second electric motor linked to a third gear module through a motor shaft having a first extremity and a second extremity, said third gear module including a tertiary shaft, having a first extremity and a second extremity, on which are arranged a first tertiary gear and a second tertiary gear, and
   the first secondary gear meshing with the second tertiary gear.

2. The electric powertrain according to claim 1, wherein a third primary gear is arranged on the second extremity of the primary shaft.

3. The electric powertrain according to claim 1, wherein a coupling member is arranged along the primary shaft between the second primary gear and the third primary gear.

4. The electric powertrain according to claim 1, wherein the electric powertrain further comprises:
   a second countershaft wherein the first quaternary gear is meshing a pinion fixedly secured at the second extremity of the motor shaft and the second quaternary gear is meshing with the first tertiary gear such that the countershaft and the motor shaft are disposed in parallel and
   a coupling member arranged at the first extremity of a tertiary shaft configured to reach a first position wherein the coupling member meshes with the pinion so that the motor shaft is drivingly engaged with the tertiary shaft, a second position wherein the coupling member meshes with the first tertiary gear so that the first tertiary gear drivingly engages the tertiary shaft and a neutral position in which the coupling member allows the first tertiary gear to rotate freely around the tertiary shaft.

5. The electric powertrain according to claim 1, wherein a third tertiary gear is arranged on the second extremity of the tertiary shaft.

6. The electric powertrain according to claim 5, wherein a coupling member is arranged along the tertiary shaft between a second tertiary gear and the third tertiary gear.

7. The electric powertrain according to claim 1, wherein a second secondary gear is arranged on the secondary shaft.

8. A vehicle, electric or hybrid, comprising an electric powertrain according to claim 1.

* * * * *